(12) United States Patent
Heinz et al.

(10) Patent No.: US 6,507,686 B1
(45) Date of Patent: Jan. 14, 2003

(54) CABLE NETWORK WITH LIGHT WAVEGUIDE CABLE FOR INSTALLATION IN PIPELINES OF EXISTING SUPPLY LINE SYSTEMS

(75) Inventors: Edgar Heinz, Steinach; Thomas Mueller, Sonneberg; Helmut Nowsch, Coburg; Joachim Schaefer, Neustadt; Ernst Mayr, Starnberg, all of (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 09/439,510

(22) Filed: Nov. 12, 1999

(30) Foreign Application Priority Data

Nov. 13, 1998 (DE) .......................................... 198 52 572

(51) Int. Cl.[7] .............................. G02B 6/44; G02B 6/50; F16L 55/00
(52) U.S. Cl. ....................... 385/100; 385/101; 138/103; 174/47
(58) Field of Search ............................ 174/47; 138/103, 138/108; 385/100–114

(56) References Cited

U.S. PATENT DOCUMENTS

| | | | | |
|---|---|---|---|---|
| 4,647,251 A | * | 3/1987 | Gale ........................... | 248/49 |
| 5,334,801 A | * | 8/1994 | Mohn ........................... | 174/47 |
| 5,673,352 A | * | 9/1997 | Bauer et al. .................. | 385/114 |
| 6,026,897 A | * | 2/2000 | Pringle et al. ............... | 166/65.1 |
| 6,148,866 A | * | 11/2000 | Quigley et al. .............. | 138/125 |

FOREIGN PATENT DOCUMENTS

| | | | | |
|---|---|---|---|---|
| DE | 42 03 718 | | 8/1993 | |
| DE | 297 00 912 | | 4/1997 | |
| DE | 29801408 U1 | | 4/1998 | ............ H02G/9/06 |
| EP | 0855773 A1 | | 7/1998 | ............ H02G/3/04 |
| EP | 0964106 A1 | | 12/1999 | ............ H02G/9/06 |
| FR | 2758917 | | 7/1998 | ............ H02G/3/26 |
| GB | 2124728 A | | 2/1984 | ............ F16L/9/00 |
| GB | 2154808 A | * | 9/1985 | ............ H02G/3/04 |
| WO | WO99/65129 | | 12/1999 | ............ H02G/9/06 |

* cited by examiner

*Primary Examiner*—Hemang Sanghavi
*Assistant Examiner*—Omar Rojas, Jr.

(57) ABSTRACT

A cable network with a light waveguide cable which is introduced in the pipeline of an existing pipeline system. The light waveguide cable is arranged along a line, preferably at the vertex of the pipeline, and is provided with a protective layer so that a smooth transition exists between the wall surfaces of the pipeline and the cable.

31 Claims, 4 Drawing Sheets

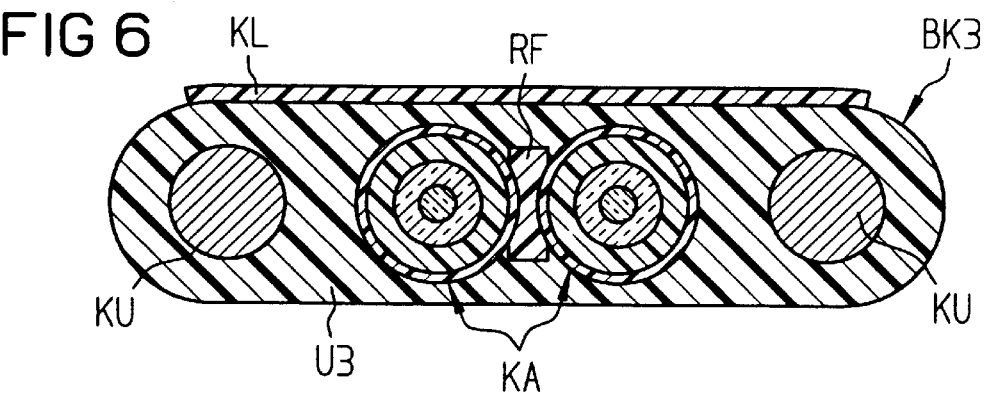
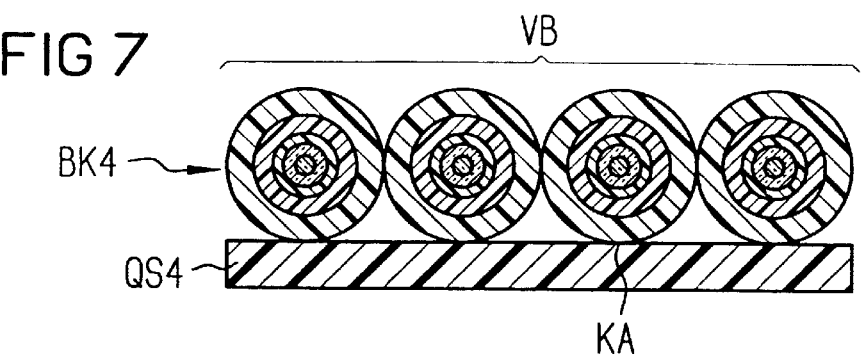
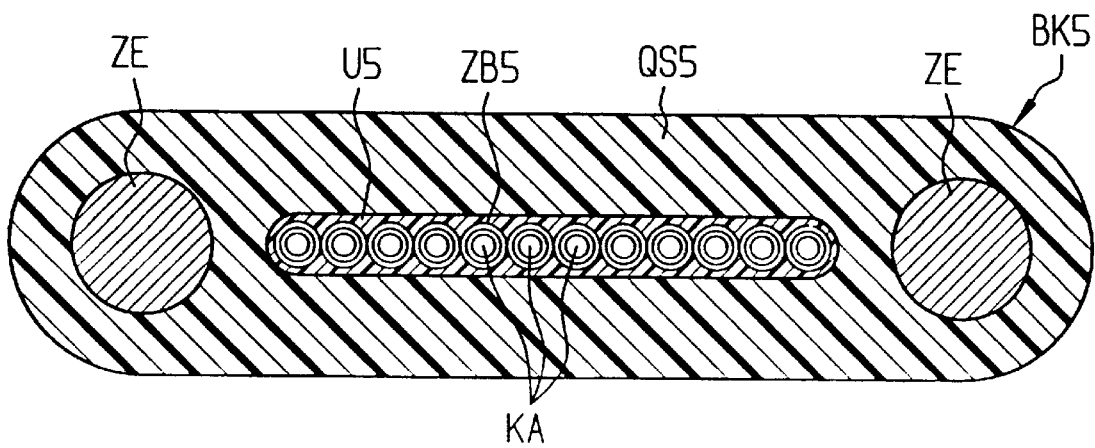

CABLE NETWORK WITH LIGHT WAVEGUIDE CABLE FOR INSTALLATION IN PIPELINES OF EXISTING SUPPLY LINE SYSTEMS

BACKGROUND OF THE INVENTION

The invention is concerned with a cable network with light waveguide cables for the installation in pipelines of existing supply line systems, for example a sewer system.

DE 42 03 718 discloses a light waveguide cable network and a method for its laying. The light waveguide cables are laid in a pipeline system of a sewer, in particular storm sewers, with the light waveguide cable network being fastened at the walls. Thus, transitions are provided for the light waveguide cables at the manhole covers or at the walls of the manhole or access shafts.

German Gebrauchsmuster 297 00 912 discloses a light waveguide cable network in a sewer system or pipe system primarily used for other purposes. The light waveguide cables are fastened at the wall of the sewer system or the pipe system. The light waveguide cables are secured within an inaccessible area of the sewer system or pipe system with fastening elements that are beneficially shaped in terms of the flow technology, whereby the fastening elements are elastically twisted so that they press against the wall and spread.

SUMMARY OF THE INVENTION

The invention is based on the object of creating a cable network, wherein light waveguide cables are used that are specifically appropriate for the use in sewer systems or pipe systems, wherein precautions have been taken that at no point of the system are agglomerations allowed for dirt carried in the sewer system or pipe system.

The present object is achieved according to the present invention with a cable network, wherein the light waveguide cables are arranged along a generated line of the pipeline under a protective layer, and the protective layer compensates for the transitions between the inside wall of the pipeline and the arranged light waveguide cable.

Given the previously known laying of cables within sewer systems or pipeline systems, fastening means are proposed at which deposits of parts carried in the sewage water can potentially occur. Given a cable network with light waveguide cables and a protective layer arranged thereover according to the present invention, such deposits are no longer possible, since the protective layer that is arranged over the respectively used light waveguide cable forms a smooth surface and compensates the transitions between the introduced light waveguide cable and the inside wall of the sewer system or pipe system. According to the invention, particularly appropriate light waveguide cables are also created therefor with which a cable network can be constructed. An example is what is referred to as "micro cables", which comprise a tube with a diameter of 2mm through 10mm, and the light waveguides being loosely introduced in the tube. These micro cables are guided in a groove along a generated line of the sewer system or pipe system, and the groove depth corresponds to approximately the light waveguide cable. The balancing protective layer is then arranged thereover.

Given utilization of thin light waveguide cable units or band-shaped light waveguide cable units, which will be explained hereinafter, it is sufficient to fashion a shallow groove, for example, merely by removing the glaze given ceramic tubes of the sewer system and pipe system. After the fastening of the respective band-shaped light waveguide cable in the shallow groove, the protective layer is, in turn, placed thereover, so that a continuous transition between the light waveguide cable and the wall is provided.

In the two described cases, the laying of the cable in an inaccessible sewer system or pipe system occurs with the aid of appropriate robots, which are known per se and which robots, for example, can also be used given house service connections with a diameter of only 150mm and even down to 100mm. Generally, the optimal insert position for the respective light waveguide cable is in the vertex of the pipe of the sewer system or pipe system, since a direct contact of the flowing medium only rarely occurs at the vertex and since other pipes are only rarely introduced at the vertex.

According to the invention, the light waveguide cables to be laid are provided with an adhesive or an adhesive coating, at least in the contact area with the wall, so that the light waveguide cable is already secured at the wall by pressing. Thus, the following application of the protective layer is significantly facilitated.

Other advantages and features of the invention will be readily apparent from the following description of the preferred embodiments, the drawings and claims.

BRIEF DESCRIPTION OF THE DRAWINGS

FIG. 6 is a cross sectional view of a band-shaped light waveguide cable with additional copper leads;

FIG. 7 is a cross sectional view of an arrangement of light waveguide compact leads on a layer resistant to transverse pressure;

FIG. 8 is a cross sectional view of a light waveguide ribbon and a band-shaped jacket;

DESCRIPTION OF THE PREFERRED EMBODIMENTS

Figure 1:
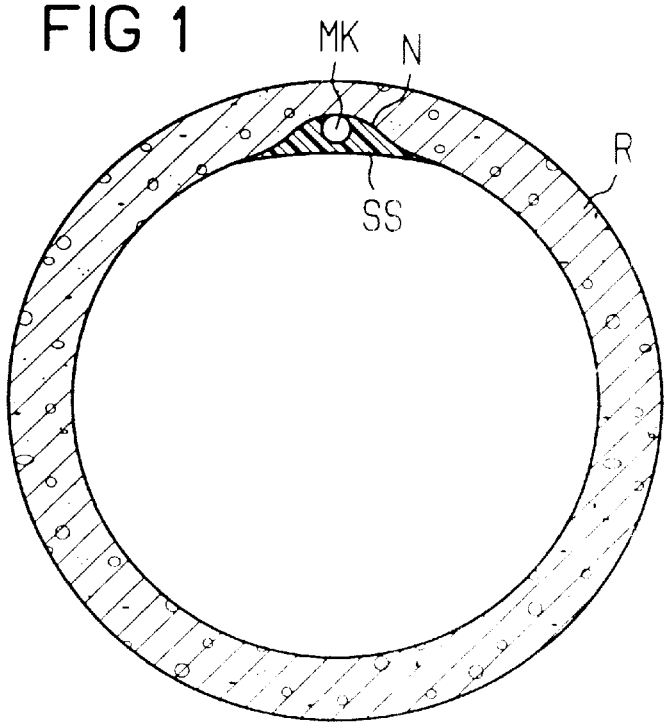
FIG. 1 is a cross sectional view of a cable network with a tube-shaped micro cable.

FIG. 1 shows a cross section of a pipeline R of an existing sewer system or pipe system. In addition, it shows that a groove N is introduced longitudinally to extend in the vertex area of the pipeline R, for example, by milling, and the depth of groove is so large that a micro cable MK can be firmly embedded therein. A protective layer SS which is, for example, made of an epoxy compound is applied, so that the entire groove layer is completely compensated without any transitions. Therefore, an agglomeration of carried dirt particles is greatly reduced or impossible.

Figure 2:
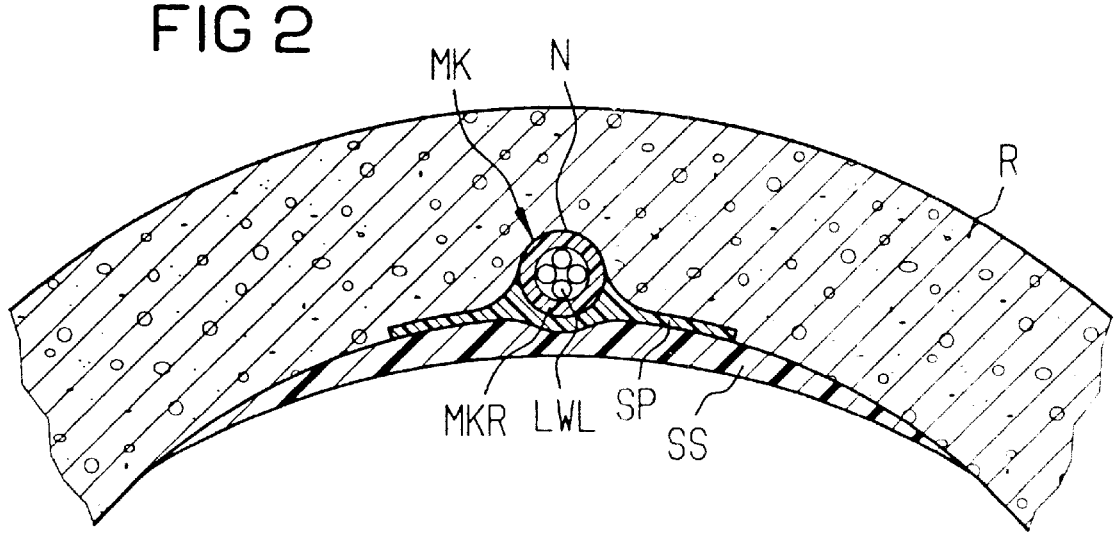
FIG. 2 is an enlarged partial cross sectional view of a cable network with a tube-shaped micro cable and an insert as a protection profile.

In the embodiment illustrated in FIG. 2, the vertex area of the pipeline R contains a micro cable MK, which is also introduced in the longitudinally extending groove N. The micro cable is composed of a tube MKR and light waveguide cables LWL, which are loosely introduced therein. Here, a protection profile SP is additionally applied to extend longitudinally over the introduced micro cable MK and this is covered by a protective layer SS, which is applied over this profile SP.

Figure 3:
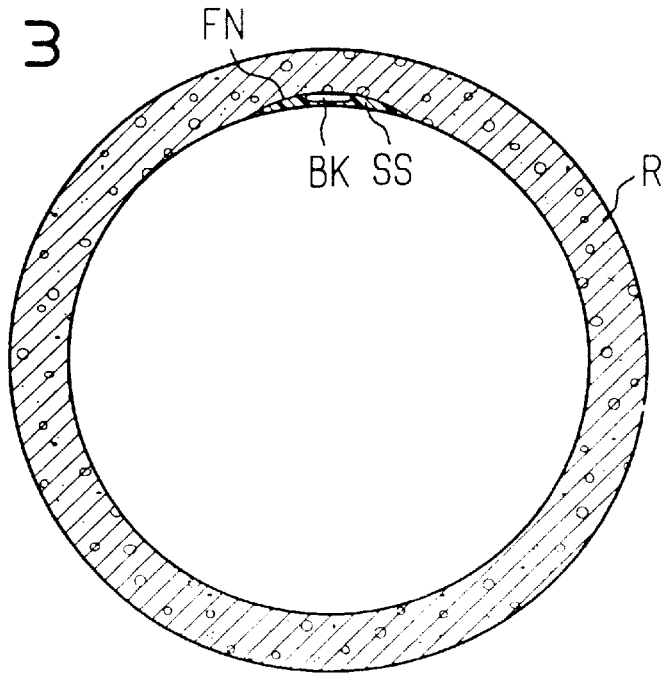
FIG. 3 is a cross sectional view of a pipe of a cable network with a band-shaped light waveguide cable in a shallow groove.

In the arrangement of FIG. 3, the pipeline R has a shallow groove FN, which has been arranged in the vertex, for example, merely by removing the glaze layer when a coated ceramic tube is being utilized for the pipeline system. A correspondingly appropriate light waveguide cable BK is embedded in this shallow groove FN, and this light waveguide cable is shown as a band-shaped profile in cross section. Thus, only a slight groove depth of the shallow groove FN is necessary so that the walls of the pipeline are only partly weakened. A protective layer SS is, in turn, inventively arranged over this arrangement in order to lay out and smooth the inside wall without transitions. The protective layer is preferably made of an epoxy compound.

Figure 4:
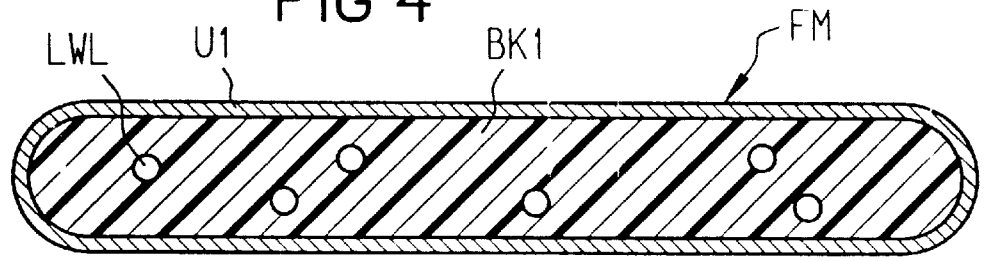
FIG. 4 is a cross sectional view of a band-shaped light waveguide cable with a jacket made of stainless steel.

A band-shaped light waveguide cable BK1 is shown in FIG. 4 and is extremely well-suited for being placed in a shallow groove, according to the arrangement of FIG. 3. This band-shaped light waveguide BK1 has a thin jacket U1, for example made of stainless steel, and in the inside, has light waveguides LWL, which are arranged to extend longitudinally, for example in a standard gel-like filling compound FM. Due to this thin construction, only a shallow groove with a particularly small groove depth is necessary.

Figure 5:
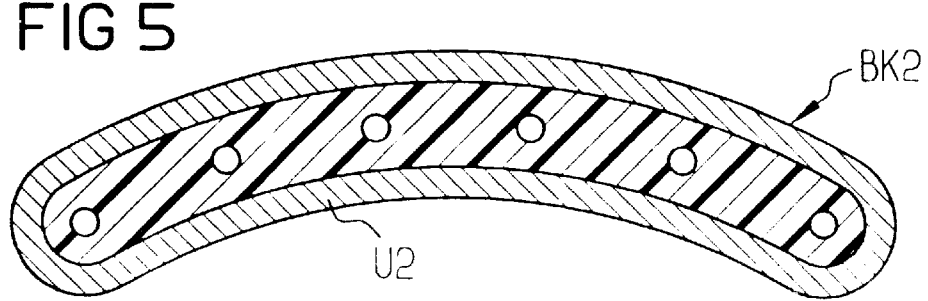
FIG. 5 is a cross sectional view of a band-shaped light waveguide cable according to FIG. 4 in an adapted form.

A band-shaped light waveguide cable BK2 is shown in FIG. 5 and corresponds to the exemplary embodiment according to FIG. 4 and, in addition, the jacket U2 is fashioned in an arcuate cross section for a better adaptation to the interior of the pipe. Such a light waveguide cable, for example, is referred to as a stainless steel band and has a breadth of approximately 4 mm and a height or thickness of approximately 1.5 mm. The side of the stainless steel band that face toward the groove is preferably coated with an adhesive, so that a fast adhesion initially occurs in the groove given the process of laying. As a result thereof, the following covering of this area with the protective layer is significantly simplified.

A band-shaped cable BK3 of FIG. 6 has a jacket U3 surrounding compact leads KA, which are embedded in the middle between copper leads KU, which are embedded adjacent the ends of the band. Such a cable is referred to as a "hybrid cable". The light waveguide compact leads KA can be fashioned as two-layer compact leads, wherein the outside diameter of the layers respectively are 0.65/1/1.2 mm. For example, polycarbonate (PC) is used on the inside and, for example, polybuteneterephthalate (PBT) or polyester is used for the outside. Instead of compact leads, fibers with a firmly extruded coating can also be used, for example, with a polyvinyl chloride (PVC) sheath or with a FRNC sheath, which is a flame-resistant non-corrosive sheath, on a polyethylene (PE) base. Likewise, however, one-layer compact leads with outside diameters of 0.35/0.65 mm can also be used. The outside layer can also be of, for example, polycarbonate (PC). The embedded copper leads for electrical transmission have a diameter of 0.6 mm through 0.9 mm. The light waveguide compact leads and the copper leads are embedded to extend parallel in a common jacket U3, which, for example, is formed of a polypropylene (PP) or polyvinyl chloride (PVC). The breadth or width of this hybrid cable, for example, is 6.1 mm given the embodiment with two-layer compact leads and is 3.5 mm given the embodiment with one-layer compact leads. The thickness of the cable BK3 is 1.5 mm in the first embodiment and is 0.9 mm in the second embodiment. For example, a tear thread RF is additionally also embedded in the middle of the jacket U3. The jacket U3 also has, on one surface, a layer KL of an adhesive for attachment to the interior wall of the pipeline.

A light waveguide cable that is also appropriate for use in the pipeline system is illustrated in FIG. 7. What is referred to as a light waveguide quad ribbon VB comprises a compact lead with a 0.65 mm diameter, which is known per se. This light waveguide quad ribbon VB with its compact leads KA is applied on a layer QS4, which is resistant to transverse pressure and, therefore, forms a band-shaped light waveguide cable BK4, which can be used in a pipeline system of the type mentioned hereinbefore. Thus, the balancing protective layer is placed thereover after fixing the cable in a shallow groove.

Another band-shaped cable BK5 is shown in FIG. 8 and, for example, is a twelve light waveguide ribbon ZB5 that extends parallel to tensile elements ZE, which are embedded in the band-shaped protective layer QS5, which is resistant to transverse pressure. The twelve light waveguide ribbon ZB5 comprises twelve compact leads KA that are guided to extend parallel to each other and which compact leads KA are combined in a jacket U5. Given this band-shaped cable BK5, an especially longitudinal stable embodiment is achieved due to the insertion of the tensile elements ZE. As it has been already indicated in FIG. 6, an adhesive coating KL or an adhesive can be applied on the side of the cable which faces toward the groove, by means of which adhesive a fixing immediately occurs given insertion of the respective light waveguide cable. A two-component adhesive or a contact adhesive can be utilized as the adhesive, whereby a protection foil must be pulled off before use when having a contact adhesive.

Figure 9:
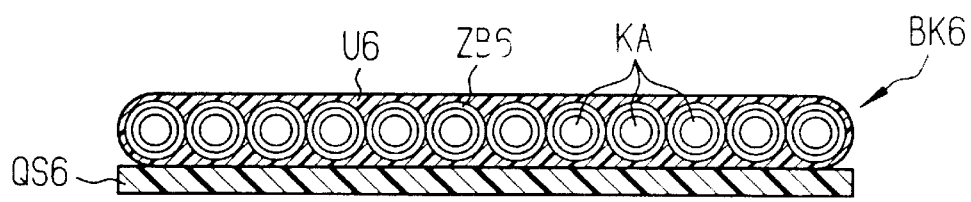
FIG. 9 is a cross sectional view of a light waveguide band on a layer resistant to transverse pressure.

The tensile elements ZE, for example, can be steel wires. In FIG. 9, a light waveguide cable BK6 comprises a twelve light waveguide ribbon ZB6, which includes twelve compact leads KA that extend parallel to one another and are combined in a plastic jacket U6. The twelve light waveguide ribbon ZB6 is applied on a layer QS6, which is resistant to transverse pressure. An example of a layer QS6 is a glass fiber reinforced plastic layer and the ribbon ZB6 is attached thereto by gluing. This embodiment of a light waveguide cable BK6 is also particularly appropriate for the insertion in a longitudinally extending shallow groove of a pipeline. The protective layer is also applied after fixing of this light waveguide cable BK6 in the pipeline.

Figure 10:
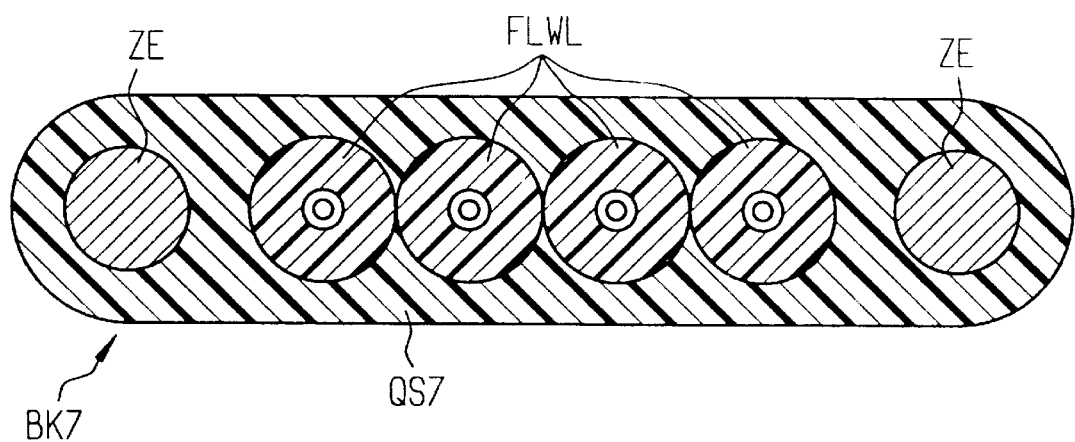
FIG. 10 is a cross sectional view of a cable with light waveguides with a firmly extruded coating in a common jacket with embedded tensile elements.

An exemplary embodiment is a band-shaped cable BK7, which is illustrated in FIG. 10. The cable BK7 has light waveguides FLWL that have a firmly extruded coating of plastic. These light waveguides are arranged to extend parallel in a layer or jacket QS7 of a material resistant to transverse pressure. In addition, tensile elements ZE are embedded to extend longitudinal to the outside edges of the layer QS7. The required tensile strength in the lengthwise direction is, thus, guaranteed by the means of these tensile elements ZE.

Given all exemplary embodiments, a bonding adhesive, for example an acrylic adhesive, can also be used. One-compoL,e,lt adhesives or two-component adhesives are, for example, polyisobutylene (oppanol), which exhibits a long pot life, for example, processing time, and can also be used as a curing adhesive. Contact adhesives which are initially covered with a protective foil can also be used.

Although various minor modifications may be suggested by those versed in the art, it should be understood that we wish to embody within the scope of the patent granted hereon all such modifications as reasonably and properly come within the scope of our contribution to the art.

We claim:

1. A cable network with light waveguide cables for installation in a pipeline of an existing system, comprising a light waveguide cable being arranged in a generated groove of the pipeline of the existing supply system, and a protective layer that overlies the light waveguide cable, so that the protective layer compensates for the transitions between a surface of the inside wall of the pipeline and the arranged light waveguide cable, the protective layer only covering a portion of the surface of the inside wall of the pipeline.

2. A cable network according to claim 1, wherein the protective layer is formed of a curing epoxy compound.

3. A cable network according to claim 1, which includes a stretched-out protection profile made of a plastic consisting from a group consisting of polyvinyl chloride, polyethylene, said protection profile being arranged over the light waveguide cable.

4. A cable network according to claim 3, wherein the protection profile is arranged between the light waveguide cable and the protective layer.

5. A cable network according to claim 1, wherein the light waveguide cable is arranged in a longitudinally extending groove formed in the wall of the pipeline.

6. A cable network according to claim 5, wherein the groove extends into the wall of the pipeline.

7. A cable network according to claim 5, wherein the groove is a shallow grove at least partially defined within a surface glaze of the pipeline.

8. A cable network according to claim 1, wherein a band-shaped light waveguide cable is used.

9. A cable network according to claim 8, wherein the band-shaped cable is formed of a thin tube body and the light waveguides are loosely introduced therein and contained in a gel-like filling compound.

10. A cable network according to claim 8, wherein the band-shaped cable is composed of a light waveguide ribbon of compact leads extending parallel to each other.

11. A cable network according to claim 8, wherein the band-shaped light waveguide cable is a hybrid cable having copper leads and light waveguide fibers.

12. A cable network according to claim 11, wherein the hybrid cable has two layers of light waveguide compact leads and copper leads.

13. A cable network according to claim 11, wherein the hybrid cable has one layer of light waveguide compact leads and copper leads.

14. A cable network according to claim 11, wherein the hybrid cable includes a tear thread.

15. A cable network according to claim 11, wherein the hybrid cable has a jacket made of a material selected from polypropylene and polyvinyl chloride.

16. A cable network according to claim 8, wherein the light waveguide cable includes tensile elements.

17. A cable network according to claim 8, wherein the band-shaped cable comprises a light waveguide ribbon of leads extending parallel to one another, said light waveguide cable having a transverse-stable layer on a side that faces toward the inside of the pipeline, said transverse-stable layer being a padding layer made of plastic selected from a group consisting of rigid polyvinyl chloride, polyethylene and glass fiber reinforced plastics.

18. A cable network according to claim 8, wherein the band-shaped light waveguide cable contains light waveguides with a firmly extruded coating.

19. A cable network according to claim 8, wherein the band-shaped light waveguide cable comprises a light waveguide ribbon of compact leads firmly applied on a transverse-stable layer.

20. A cable network according to claim 8, wherein the band-shaped light waveguide cable is arcuately adapted in cross section to the inside wall surface of the pipeline.

21. A cable network according to claim 1, wherein the light waveguide cable is a micro cable formed by a tube having light waveguides loosely introduced therein.

22. A cable network according to claim 1, wherein the light waveguide cable is coated with an adhesive on the side that faces toward the inside wall of the pipeline.

23. A cable network according to claim 22, wherein the adhesive is selected from a group consisting of a bonding adhesive , an acrylic adhesive, a curing plastic adhesive of a one-component basis, a curing plastic adhesive of a two-component basis with a long pot life and a polyisobutylene.

24. A cable network according to claim 22, wherein the adhesive is a contact adhesive provided with a protective foil which is removed during installation.

25. Method for installing a light waveguide cable in a pipeline of an existing supply system comprising the steps of installing a light waveguide cable along a generated line defined by an inside wall of the pipeline of the existing supply system and then applying a protective layer upon the light waveguide cable, so that the protective layer compensates for the transitions between a surface of the inside wall of the pipeline and the installed light waveguide cable.

26. Method according to claim 25, wherein the protective layer is being applied such that only a portion of the surface of the inside wall of the pipeline is covered.

27. Method according to claim 25, wherein the installation of the light waveguide cable and the protective layer is performed by means of a robot.

28. A method for installing a light waveguide cable in a pipeline of an existing supply system comprising:

forming a groove in a portion of the pipeline;

placing a portion of the light waveguide cable within the groove of the pipeline; and applying a protective layer over the light waveguide cable.

29. The method according to claim 28, the step of placing the light waveguide cable within the groove further comprising attaching the light waveguide cable to the pipeline with an adhesive.

30. The method according to claim 28, the pipeline having a generally uniform inner diameter after the step of applying the protective layer.

31. The method according to claim 28, the step of applying a protective layer further comprising applying the protective layer so that only a portion of the surface of the inside wall of the pipeline is covered by the protective layer.

* * * * *